United States Patent Office 3,519,415
Patented July 7, 1970

3,519,415
PHYTOCIDAL N-(4-NITROPHENYLSULFONYL)-N'-(CHLOROSUBSTITUTED ACETYL) UREAS
Lowell R. Smith, Chesterfield, and Angelo John Speziale, Creve Coeur, Mo., assignors to Monsanto Company, St. Louis, Mo., a corporation of Delaware
No Drawing. Filed June 17, 1968, Ser. No. 737,325
Int. Cl. A01n 9/16
U.S. Cl. 71—103
6 Claims

ABSTRACT OF THE DISCLOSURE

Compounds of the class N-(4-nitrophenylsulfonyl)-N'-(chloro substituted acetyl) ureas which compounds are phytocidally active.

---

This invention relates to new and useful compounds, that is N-(4-nitrophenylsulfonyl)-N'-(chloro substituted acetyl) ureas of the general formula

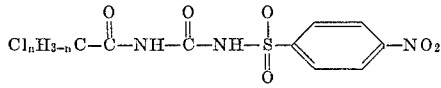

wherein $n$ is a whole number from 1 to 3, inclusive, but preferably the whole number 3.

These compounds are readily prepared by bringing together and reacting substantially equimolecular proportions of a chloro substituted acetyl isocyanate of the formula

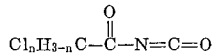

wherein $n$ is a whole number from 1 to 3, inclusive, and 4-nitrophenylsulfonamide

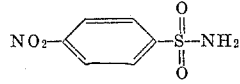

in the presence of suitable inert organic liquid, such as benzene, toluene, xylene, etc. and mixtures thereof.

As illustrative of the preparation of the compounds of this invention but not limitative thereof is the following:

EXAMPLE I

To a suitable reaction vessel equipped with a thermometer, agitator and reflux condenser is charged approximately 4.7 parts by weight of α,α,α-trichloroacetyl isocyanate, approximately 5.1 parts by weight of 4-nitrophenylsulfonamide, and approximately 55 parts by weight of toluene. While agitating the so charged mass it is heated up to its boiling point and then refluxed for about 21 hours. The mass is then cooled to about room temperature and filtered. The filter cake is dried and then the dried cake is recrystallized from acetone, yielding N - (4 - nitrophenylsulfonyl)-N'-(α,α,α-trichloroacetyl) urea, M.P. 172–174° C.

EXAMPLE II

Employing the procedure of Example I but replacing α,α,α-trichloroacetyl isocyanate with an equimolecular amount of α,α-dichloroacetyl isocyanate there is obtained N-(4-nitrophenylsulfonyl)-N'-(α,α-dichloroacetyl) urea.

EXAMPLE III

Employing the procedure of Example I but replacing α,α,α-trichloroacetyl isocyanate with an equimolecular amount of α-chloroacetyl isocyanate there is obtained N-(4-nitrophenylsulfonyl)-N'-(α-chloroacetyl) urea.

The methods by which the aforedescribed compounds of this invention are isolated will vary slightly with the reactants employed and the product produced. Further purification by selective solvent extraction or by absorptive agents such as activated carbon or clays can precede the removal of the inert organic liquid (or solvent) when the latter is employed. Additionally an inert organic solvent can be added to and in the purification by absorptive agents. However, in that the products are phytocidally active they are generally satisfactory for phytocidal purposes without further purification.

The compounds of this invention are uniquely useful in inhibiting the growth of noxious grasses (i.e. narrow leaf plants) and noxious broad leaf plants prior to their respective emergence from soil or other growth media by treating said soil or other growth media with an effective growth inhibiting amount thereof. To illustrate their unique pre-emergent activity, but not limitative thereof, is the following:

Seeds of a variety of several different plants itemized hereinafter each representing a principal botanical species are planted in each of several aluminum pans by scattering them randomly over the surface of a good grade of top soil treated with 0.05% by weight based thereon of a resinous polyelectrolyte soil conditioner which was compacted to a depth of ⅜″ from the top of each pan. The so-seeded respective pans are then covered with ⅜″ of the aforesaid prepared soil mixture and the respective pans levelled.

The levelled surface of the soil in each pan, exclusive of the control pan, is then sprayed with an aliquot of acetone containing the following compounds each at the rate of 5 pounds per acre, which compounds are identified by code as follows:

Compound:
    A—N-(4-nitrophenylsulfonyl)-N'-(α,α,α-trichloroacetyl) urea
    B—N-(4-nitrophenylsulfonyl) urea
    C—N-(4-chlorophenylsulfonyl) urea
    D—N-(4-nitrophenylsulfonyl)-N'-(n-propyl) urea
    E—N-(3,4-dichlorophenyl)-N'-(α,α,α-trichloroacetyl) urea
    F [1]—N-(4-nitrophenylsulfonyl) α-chloroacetamide

[1] Exception.—This compound wase applied in the same manner but at the rate of 25 pounds per acre.

The respective pans are placed in a sand bench and ½″ of water added to the bench. The soil absorbs moisture through perforations in the bottom of the respective pans until the soil surface of each is about one-half moist, by which time the excess water in the sand bench is drained off. The remaining soil surface in each pan is moistened by capillary action.

Fourteen days after application of each of the aforeitemized compounds the results are observed and recorded. The number of plants which emerged from the soil are counted and converted to a phytocidal rating by means of a fixed scale based on average percent emergence. (Emergence rates are established for all new seed lots and periodic checks run on old seed in current use.) The scale used is as follows:

CONVERSION SCALE

| Seed lot, percent emergence (control) | Number of plants emerging | | | |
|---|---|---|---|---|
| | 3 | 2 | 1 | 0 |
| 100 | 0–5 | 6–10 | 11–15 | 16–20 |
| 90 | 0–5 | 6–9 | 10–13 | 14–20 |
| 80 | 0–4 | 5–8 | 9–12 | 13–20 |
| 70 | 0–4 | 5–7 | 8–11 | 12–20 |
| 60 | 0–3 | 4–6 | 7–9 | 10–20 |
| 50 | 0–3 | 4–5 | 6–8 | 9–20 |
| 40 | 0–2 | 3–4 | 5–6 | 7–20 |

The relative emergence value of the respective afore-itemized compounds with respect to their phytocidal effects on each plant is indicated by a number as follows:

0—No inhibition
1—Slight inhibition
2—Moderate inhibition
3—Severe inhibition

TABLE I

| Plant | Compound | | | | | | Control |
|---|---|---|---|---|---|---|---|
| | A | B | C | D | E | F[1] | |
| Grasses: | | | | | | | |
| Wild oat | 2 | 0 | 0 | 0 | 0 | 0 | 0 |
| Brome grass | 3 | 0 | 0 | 0 | 0 | 0 | 0 |
| Rye grass | 3 | 0 | 0 | 0 | 0 | 0 | 0 |
| Foxtail | 3 | 3 | 0 | 0 | 0 | 2 | 0 |
| Crab grass | 3 | 3 | 0 | 1 | 0 | 3 | 0 |
| Sorghum | 2 | 0 | 0 | 0 | 0 | 1 | 0 |
| Broad leaf: | | | | | | | |
| Radish | 3 | 0 | 0 | 0 | 0 | 2 | 0 |
| Sugar beet | 3 | 0 | 0 | 0 | 0 | 1 | 0 |
| Pigweed | 3 | 0 | 0 | 0 | 0 | 1 | 0 |
| Wild buckwheat | 3 | 0 | 0 | 0 | 0 | 1 | 0 |
| Tomato | 3 | 0 | 0 | 0 | 0 | 3 | 0 |

[1] Applied at the rate of 25 pounds per acre while Compounds A, B, C, D and E, respectively, were applied at a rate of 5 pounds per acre).

From the foregoing pre-emergent phytocidal evaluation data it is apparent that the N-(4-nitrophenylsulfonyl)-N'-(chloro substituted acetyl) ureas of this invention are effective pre-emergence herbicides. Valuable pre-emergent phytocidal effects will be observed by applications of small amounts, for example, as low as 0.1 lb. of active component per acre as well as higher concentrations, for example, 30 lbs. per acre. The preferred range of application for pre-emergent phytocidal purposes is from about 1 to about 15 lbs. per acre.

The compounds of this invention are also useful as phytocides against a wide variety of plant life in the growing or post-emergent state, particularly noxious grasses and noxious broad leaf plants in certain growing crops. To illustrate such the following respective compounds identified by code as follows:

Compound:
  A—N-(4-nitrophenylsulfonyl)-N'-(α,α,α-trichloroacetyl) urea
  B—N-(4-nitrophenylsulfonyl) urea
  C—N-(4-chlorophenylsulfonyl) urea
  D—N-(4-nitrophenylsulfonyl)-N'-(n-propyl) urea
  E—N-(3,4-dichlorophenyl)-N'-(α,α,α-trichloroacetyl) urea
  F—N-(4-nitrophenylsulfonyl) α-chloroacetamide
  G—N-(3,4-dichlorophenylsulfonyl) urea
  H—N-(4-nitrophenyl) α,α,α-trichloroacetamide
  I—N-(4-chlorophenyl) α,α,α-trichloroacetamide were respectively applied as aqueous sprays at a concentration of 0.5 percent by weight at a rate of 10 pounds thereof per acre, exclusive of the control, to separate plots both having 14 days established growth of wild oat, brome grass, rye grass, radish, sugar beet, foxtail, crab grass, pigweed, sorghum and tomato. An inspection of the respective plots conducted fourteen days after the application revealed the following tabulated results wherein the relative value of each compound with respect to its phytocidal effect on the various growing plants is indicated by a number as follows:

0—No phytotoxicity
1—Slight phytotoxicity
2—Moderate phytotoxicity
3—Severe phytotoxicity

TABLE II

| Plant | Compound | | | | | | | | | Control |
|---|---|---|---|---|---|---|---|---|---|---|
| | A | B | C | D | E | F | G | H | I | |
| Grasses: | | | | | | | | | | |
| Wild oat | 3 | 0 | 0 | 0 | 0 | 0 | 0 | 0 | 0 | 0 |
| Brome grass | 3 | 0 | 0 | 0 | 1 | 0 | 0 | 0 | 0 | 0 |
| Rye grass | 3 | 0 | 0 | 0 | 1 | 0 | 0 | 0 | 0 | 0 |
| Crab grass | 2 | 0 | 0 | 0 | 1 | 0 | 0 | 1 | 1 | 0 |
| Sorghum | 3 | 0 | 0 | 0 | 1 | 0 | 0 | 0 | 0 | 0 |
| Broad leaf: | | | | | | | | | | |
| Radish | 1 | 0 | 0 | 0 | 2 | 0 | 3 | 0 | 0 | 0 |
| Sugar beet | 0 | 0 | 0 | 0 | 1 | 3 | 3 | 0 | 0 | 0 |
| Pigweed | 2 | 0 | 0 | 0 | 2 | 0 | 3 | 0 | 3 | 0 |
| Tomato | 1 | 0 | 0 | 0 | 1 | 0 | 4 | 0 | 0 | 0 |

From the foregoing post-emergent phytocidal evaluation data it is apparent that the N-(4-nitrophenylsulfonyl)-N'-(chloro substituted acetyl) ureas of this invention are selective and effective post-emergent phytocides, particularly against noxious grasses. Valuable post-emergent phytocidal effects will be observed by applications of small amounts, for example, as low as 0.1 lb. of active component per acre as well as higher concentrations, for example, 30 lbs. per acre. The preferred range of application for post-emergent phytocidal purposes is from about 1 to about 15 lbs. per acre.

It will be apparent that different effects can be obtained by modifying the method of use. For this reason an essential part of this invention is the formulation thereof so as to permit a uniform predetermined application of the new phytocides to growing plants or soil or other growth media so as to produce the desired effect. By proper selection and proportioning of the various conditioning agents either liquid or solid formulations can be prepared, and so as to adapt the new phytocide for achieving the desired result with any conventional device for treating growing plants or the surface or sub-surface of the soil or other growth media.

Although the compounds of this invention are useful per se in controlling a wide variety of plant growth in the pre-emergent or post-emergent state, it is preferable that they be supplied to the plant growing medium or growing plant in a dispersed form in a suitable extending agent.

In the instant specification and appended claims it is to be understood that the term "dispersed" is used in its widest possible sense. When it is said that the compounds of this invention are dispersed, it means that the particles thereof can be molecular in size and held in true solution in a suitable organic solvent. It means further that the particles can be colloidal in size and distributed throughout a liquid phase in the form of suspensions or emulsions or in the form of particles held in suspension by wetting agent. The term "dispersed" also means that the particles can be mixed with and distributed throughout a solid carrier providing a mixture in particulate form e.g. pellets, granules, powders, or dusts.

The exact concentration of the compounds of this invention employed in combating or controlling noxious vegetation can vary considerably provided the required dosage (i.e. phytotoxic amount) thereof is supplied to the growing plant or plant growing medium. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared phytocidal spray or particulate solid. In such a concentrate composition, a compound of this invention generally will be present in a concentration of 5 to 95 percent by weight, the residue being any one or more of the well-known phytocidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the compounds of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compounds of this invention are preferably applied to growing plants or the plant growing medium in the form of emulsions or suspensions. Emulsions or suspensions are prepared by dispersing a compound of this invention either per se or in the form of an organic solution thereof in water with the aid of a water-soluble surfactant. The term "surfactant" as employed here in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the new phytocidal ingredient in the water vehicle or carrier in which it is insoluble through lowering the surface tension of the water (see also Frear "Chemistry of Insecticides, Fungicides and Herbicides," second edition, 1948, p. 280). These surfactants include the well-known capillary active substances which may be anion-active (or anionic), or, and preferably, non-ionizing (or non-ionic) which are described in detail in volume I and II of Schwartz, Perry and Berch's "Surface Active Agents and Detergents," (1958, Interscience Publishers, Inc., New York) and also in the November 1947 issue of Chemical Industries (pp. 811–824) in an article entitled "Synthetic Detergents" by John W. McCutcheon and also in the July, August, September, and October 1952 issues of Soap and Santiary Chemicals under the title "Synthetic Detergents." The disclosures of these articles with respect to surfactants, i.e. the anion-active and non-ionizing capillary active substances are incorporated in this specification by reference in order to avoid unnecessary enlargement of this specification. The preferred surfactants are the water-soluble non-ionic surface-active agents set forth in U.S. 2,846,398 (issued Aug. 4, 1958).

The compounds of this invention can be dispersed by suitable methods (e.g. tumbling or grinding) in solid extending agents either of organic or inorganic nature and applied to growing plants or plant growing medium in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. attapulgus clay. These mixtures can be used for phytocidal purposes in the dry form or by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combating noxious vegetation or they can be provided in a concentrated form suitable for mixing with or dispersing in other extending agents. As illustrative of a particularly useful concentrate is an intimate mixture of the compound of this invention with a water-soluble non-ionic surfactant which lowers the surface tension of water in the weight proportions of 0.1 to 15 parts of surfactant with sufficient of a compound of this invention to make 100 parts by weight. Such a concentrate is particularly adapted to be made into a spray for combating various forms of noxious vegetation by the addition of water thereto. As illustrative of such a concentrate is an intimate mixture of 95 parts by weight of N-(4-nitrophenylsulfonyl)-N'-($\alpha,\alpha,\alpha$-trichloroacetyl) urea and 5 parts by weight of a water-soluble non-ionic surfactant such as polyoxyethylene derivative of sorbitan monolaurate.

Another useful concentrate adapted to be made into a spray for combating noxious vegetation in a solution (preferably as concentrated as possible) of a compound of this invention in an organic solvent therefor. The said liquid concentrate preferably contains dissolved therein a minor amount (e.g. 0.5 to 10 percent by weight of the weight of the new phytocidal agent) of a surfactant (or emulsifying agent), which surfactant is water-soluble. As illustrative of such a concentrate is a solution of N-(4-nitrophenylsulfonyl)-N'-($\alpha,\alpha,\alpha$-trichloroacetyl) urea in acetone which solution contains dissolved therein a water-soluble non-ionic surfactant.

Of the surfactants aforementioned in preparing the various emulsifiable, wettable or dispersible compositions or concentrates of this invention, the non-ionic surfactants are preferred. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan respectively containing 15 to 30 moles of ethylene oxide per mole of sorbitan mono-ester or alkylphenol.

The compounds of this invention can also be advantageously employed in combination with other pesticides, including, for example, fungicides, nematocides, bactericides, and insecticides. In this manner it is possible to obtain mixtures which are effective against a wide variety of pests and other forms of noxious life.

The compounds of this invention can be employed in the form of their trialkylamine salts wherein the N-alkyl substitutents thereof are $C_{2-5}$ alkyl (i.e. ethyl, propyl, butyl, amyl, and the various isomeric forms thereof). To illustrate their preparation 4.3 parts by weight of N-(4-nitrophenylsulfonyl-N'-($\alpha,\alpha,\alpha$-trichloroacetyl) urea is dissolved in acetone and thereto is added with agitation a 100% molar excess of triethylamine. Thereafter the mixture is allowed to stand at room temperature for about 16 hours, filtered, and the filter cake dried. The dried product is the triethylamine salt of N-(4-nitrophenylsulfonyl)-N'-($\alpha,\alpha,\alpha$-trichloroacetyl) urea, a yellow solid.

Of the compounds set forth herein for comparative purposes, Compounds B, C and G, respectively, are known pharmaceutical intermediates and various preparations thereof are well known; Compound E is described in U.S. 3,213,135; Compound D is prepared by refluxing for 6 hours a mixture of 2.9 parts by weight of pyridine, 4.3 parts by weight of n-propylamine, and 10.0 parts by weight of ethyl N-(4-nitrophenylsulfonyl) carbamate, the yellow solid melting at 155.5–156° C.; Compound F is prepared by adding dropwise over a 10 minute period 4.0 parts by weight of $\alpha$-chloroacetyl chloride to an agitating mixture of 5.4 parts by weight 4-nitrophenylsulfonamide, 5.0 parts by weight of potassium carbonate and about 40 parts by weight of acetone, and thereafter agitating for about two hours at room temperature, filtering off the precipitate, dissolving the filter cake in water and neutralizing with concentrated hydrochloric acid, filtering off the precipitate, water washing the filter cake, recrystallizing the filter cake from benzene, giving a colorless solid melting at 171–172° C.; Compound H, a yellow solid melting at 148–148.5° C., is prepared by refluxing a mixture of about 13.8 parts by weight of 4-nitroaniline, about 19.1 parts by weight of α,α,α-trichloroacetyl chloride and about 100 parts by weight of toluene for about 90 minutes, cooling to room temperature, filtering off the precipitate, and recrystallizing the yellowish filter cake from toluene; and Compound I, a white solid melting at 128–128.5° C., is prepared in the same manner as Compound H except 4-nitroaniline is replaced by an equimolecular amount of 4-chloroaniline.

What is claimed is:

1. A method of inhibiting the growth of noxious grasses and noxious broad leaf plants prior to their respective emergence from soil which comprises treating said soil with an effective growth inhibiting amount of N-(4-nitrophenylsulfonyl)-N'-(α,α,α-trichloroacetyl) urea.

2. A method of claim 1 wherein the substituted urea is applied at the rate of from about 1 to about 15 pounds per acre.

3. A method for selectively controlling growing noxious grasses which comprises applying thereto a grass growth phytotoxic amount of N - (4 - nitrophenylsulfonyl)-N'-(α,α,α-trichloroacetyl) urea.

4. A phytocidal concentrate comprising on a weight basis 0.1 to 15 parts of a water-soluble non-ionic surfactant and sufficient amount of N-(4-nitrophenylsulfonyl)-N'-(α,α,α-trichloroacetyl) urea to make 100 parts by weight.

5. A phytocidal concentrate comprising N-(4-nitrophenylsulfonyl)-N'-(α,α,α-trichloroacetyl) urea dispersed in an inert organic solvent therefor and having dissolved therein 0.5 to 10 percent by weight of the weight of the said urea of a water-soluble non-ionic surfactant.

6. A method in accordance with claim 3 wherein the phytotoxic amount applied is in the range of from about 1 to about 15 pounds per acre.

References Cited

UNITED STATES PATENTS

| 2,738,355 | 3/1956 | Wilip et al. | 260—397.7 |
| 2,762,696 | 9/1956 | Gerjovich et al. | 71—120 |
| 2,864,684 | 12/1958 | Speziale | 71—118 |
| 2,909,566 | 10/1959 | Speziale | 71—118 |
| 2,973,258 | 2/1961 | Hamm et al. | 71—118 |
| 3,039,863 | 6/1962 | Fancher et al. | 71—103 |
| 3,133,808 | 5/1964 | Hamm | 71—118 |
| 3,189,431 | 6/1965 | Salyberg | 71—120 |
| 3,213,135 | 10/1965 | Speziale et al. | |
| 3,214,467 | 10/1965 | Haack et al. | 260—397.7 |
| 3,342,586 | 9/1967 | Lehureau et al. | 71—119 |

FOREIGN PATENTS

| 634,963 | 11/1963 | Belgium. |
| 904,458 | 3/1945 | France. |
| 584,585 | 1/1947 | Great Britain. |

LEWIS GOTTS, Primary Examiner

G. HOLLRAH, Assistant Examiner

U.S. Cl. X.R.

260—397.7